United States Patent
Tétrault et al.

[11] Patent Number: 5,885,461
[45] Date of Patent: Mar. 23, 1999

[54] PROCESS AND SYSTEM FOR TREATMENT OF PIG AND SWINE MANURE FOR ENVIRONMENTAL ENHANCEMENT

[75] Inventors: Madeleine Tétrault; Denys Grandbois, both of Quebec, Canada

[73] Assignee: Purin-Pur, Inc., Quebec, Canada

[21] Appl. No.: 807,255

[22] Filed: Feb. 7, 1997

[51] Int. Cl.$^6$ ................................................. B01D 61/00
[52] U.S. Cl. .................. 210/652; 210/651; 210/732; 210/641; 210/805
[58] Field of Search .................................. 210/650, 651, 210/652, 768, 732, 605, 609, 767, 770, 774, 606, 603, 805, 641

[56] References Cited

U.S. PATENT DOCUMENTS

| | | | |
|---|---|---|---|
| 4,193,206 | 3/1980 | Maffet | 210/767 |
| 4,214,377 | 7/1980 | Maffet | 210/767 |
| 4,237,618 | 12/1980 | Maffet | 210/767 |
| 4,270,279 | 6/1981 | Roedinger | 210/609 |
| 4,289,627 | 9/1981 | Disselbeck et al. | 210/767 |
| 4,295,972 | 10/1981 | Kamei | 210/710 |
| 4,342,650 | 8/1982 | Erickson et al. | 210/606 |
| 4,765,900 | 8/1988 | Schwoyer et al. | 210/603 |
| 5,256,297 | 10/1993 | Feimer et al. | 210/651 |
| 5,296,147 | 3/1994 | Koster et al. | 210/605 |
| 5,382,368 | 1/1995 | Sato | 210/770 |
| 5,435,923 | 7/1995 | Girovich | 210/770 |
| 5,707,524 | 1/1998 | Potter | 210/606 |

FOREIGN PATENT DOCUMENTS

| | | | |
|---|---|---|---|
| 000460814 | 12/1991 | European Pat. Off. | 210/651 |
| 2207899 | 8/1990 | Japan | 210/651 |

OTHER PUBLICATIONS

Scott, K. "Handbook of Industrial Membranes" 1st Ed. Elsevier, Science, Pub. Ltd, 1995.

*Primary Examiner*—Ana Fortuna
*Attorney, Agent, or Firm*—Malin, Haley, DiMaggio & Crosby, PA

[57] ABSTRACT

A low cost efficient method and system for treating animal waste and in particular pig and swine solid and liquid manure to allow removable of undesirable odors and return of sludge and liquid safely to the environment to eliminate or reduce pollution. The method and system include collecting the manure into a central tank and using a continuous process to compress the manure to separate liquid from the solid sludge and transferring the separated liquid to a separate holding tank. The dried out sludge is collected as a residual and can be safely returned to the environment. Calcium carbonate may be added to the residual sludge to reduce odor. A polymer may be added to the pressing stage of the sludge to enhance liquid sludge separation. The separated liquid is then treated with a pressure filter membrane to remove undesirable elements from the liquid after which is filtered and is returned safely to the environment either to a natural stream to a sewage system or for agricultural uses.

3 Claims, 4 Drawing Sheets

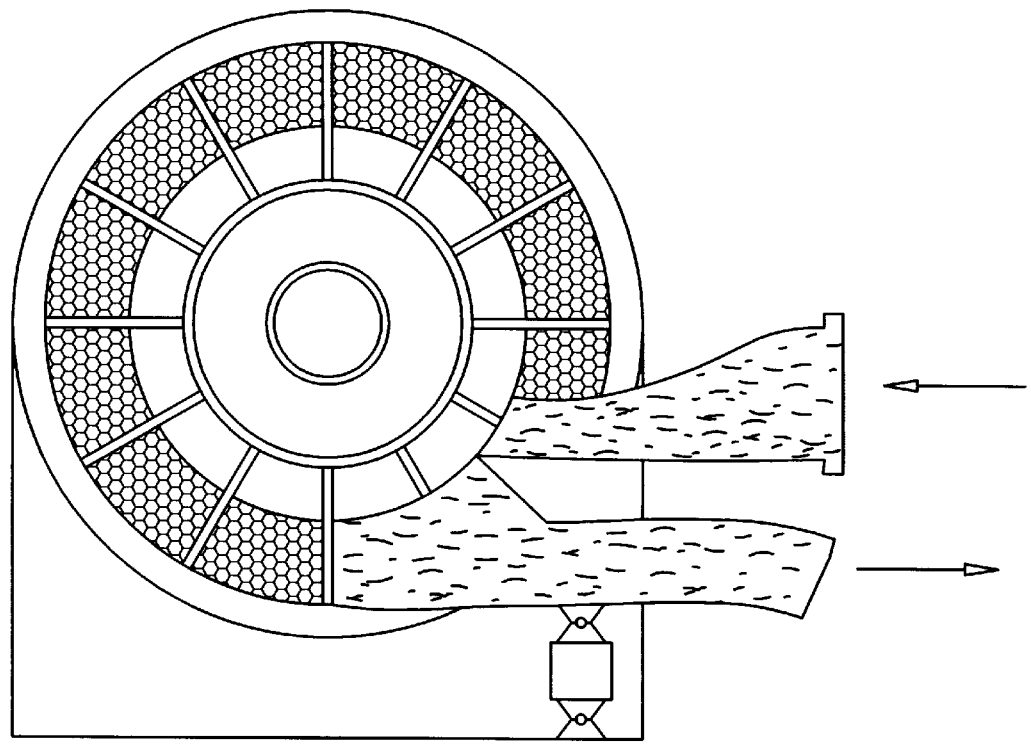
*Fig. 4 Prior Art*
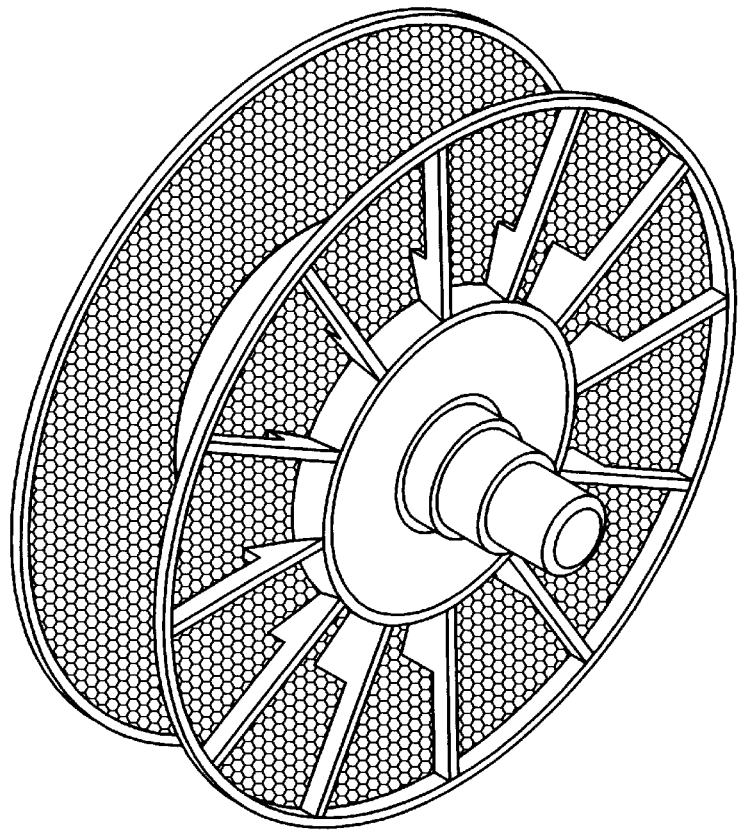

PROCESS AND SYSTEM FOR TREATMENT OF PIG AND SWINE MANURE FOR ENVIRONMENTAL ENHANCEMENT

BACKGROUND OF THE INVENTION

1. Field of the Invention

This invention relates generally to a process and system to treat domestic animal manure, such as pigs and swine, both liquid and solid, to enhance the environment so that the residual treated solid and liquid waste are free from odors, can be returned back to the environment, and can be used as productive elements of the environment and, specifically, to a process and system that treats pig and swine liquid and solid manure to eliminate odors, water contamination, and soil contamination, with the safe return of these byproducts back into the environment at low cost.

2. Description of the Prior Art

The creation of large farms for raising domestic animals at the commercial level in large numbers, such as cows, chickens, pigs, and swine, has created an increased concern environmentally over the animal waste products, typically liquid and solids, created by such large domestic production of animals. Typical environmental concerns which are each related but different in result include air contamination caused by the odors produced from the waste, ground water and stream contamination from runoffs at the waste site, and soil contamination, particularly for agricultural purposes, resulting from the large volume of waste. Therefore, organic animal waste sludges have become a tremendous environmental problem throughout the United States and throughout the world.

The prior art discloses processes for trying to solve the problem of sludge and the environment. U.S. Pat. No. : 4,193,206 issued Mar. 18, 1980 to Maffet discloses processes for drying sewage sludge and filtering water. As shown, wet sewage sludge is dried in either a thermal drying zone or a mechanical dewatering zone comprising a cylindrical chamber with a porous wall. A plasticizer is added to the dry sludge. Overall, the system is rather complicated and has several additional processes when compared with applicant's invention. U.S. Pat. No. : 4,270,279 issued Jun. 2, 1981 to Roediger discloses a method for drying, and sterilizing sewage sludge. Basically the sludge is dried and broken into small pieces and covered with quicklime. U.S. Pat. No.: 4,295,972 issued Oct. 20, 1981 to Kamei discloses a method for treating water containing waste. The method includes adding calcium oxide for preliminary drying and granulating the mixture. U.S. Pat. No. 5,013,458 issued May 7, 1991 to Christy, Sr. et al. discloses a process and apparatus for pathogene reduction and waste. The method includes using hydration reaction by elevating the pH of the sludge for releasing heat. None of the methods disclosed in these patents shows the simple and efficient treatment of sludge as disclosed by applicant's method which includes economical steps of dewatering the sludge and water filtration using membranes.

Thus, when looking at agricultural waste, the increasing production of the waste, such as pig and swine production and their waste products, presents a large problem for both farming soils and the natural environment, which includes streams, water tables, and soils.

Although this specific invention is directed toward pig and swine liquid and solid manure waste products for the treatment of odor, and liquid and solid waste contamination, the invention may have other applications for the treatment of agricultural, industrial, and municipal sludges also.

The overall invention, both the method and system, deals with two major phases. Phase one involves the separation of liquids from the sludge or animal waste product, be it pig manure or swine manure, to get the driest sludge available, while separating the water for further treatment. This greatly reduces the volume of the sludge from the first phase once a good portion of the liquid has been removed.

The second phase involves the treatment of water and liquid removed from the pig and swine waste sludge. This water is treated by a pressure-driven membrane separation technology so that it is clean enough environmentally to return to the natural water supply. One of the important features of the invention is that it limits the use of additional chemicals that have been traditionally used to treat sludge to further prevent environmental harm. Thus, the invention does not use chemicals, such as chlorine, to accomplish the results.

SUMMARY OF THE INVENTION

In the first step of the operation, pig liquid manure and swine waste, solid and liquid, are collected at a common location for treatment. In the present environment in many states of the United States, the pig and swine waste may be collected into a sludge lake much like a holding pond or tank that provides some evaporation. In any event, the materials can be collected in a single place or transported to an area where the first step of the invention will be performed. In one embodiment, a rotary press for sludge is utilized. The purpose of step one is to remove as much water and liquid from the swine and pig waste sludge materials so that the liquid is completely removed, leaving a solid cake-like material. Using a rotary press for sludge, concentrations in the 30 percent solids can be obtained. Thus, the liquid-laden sludge is fed into the rotary press on a continuous basis, allowing for continuous operation of the removal of the wastewater and separation of wastewater from the original sludge materials. To enhance the solid/liquid separation, polymers may be added to the sludge for improved liquid separation.

The water and liquids being removed from the sludge are collected and stored in a holding tank for the second step of the process. The waste water must be treated because the contaminants in the separated water are too high for direct discharge into the environment.

The rotary pressing of the sludge is desired because the process is continuous and, unlike batch processing, does not have to wait for sedimentation or decantation to occur. Typically, a rotary press needs a small physical space and can be either a mobile unit or a fixed unit, depending on the environment it is to be used in.

The second step used by the process treats the waste liquid (water) that results from pressing the sludge, which is substantially water having low suspended solids and other contaminants that cannot be directly discharged into the environment, either into a sewer or into the natural environment. The system used to accomplish the treatment of water for improving its environmental quality is nanofiltration and/or reverse osmosis. The purpose of nanofiltration and reverse osmosis is to separate residual contaminants remaining in the water, resulting in two different streams. The wastewater for treatment is fed using tangential flow direction to the separating membrane. Separation occurs using pressure force to the feed. The inlet stream is called the "concentrate" because it contains and continues to have the contaminants that cannot pass through the membrane. The treated water in the second stream is called a "permeate" and basically consists of water and some salts that pass through the membrane. The permeate is the final product of the entire process and system, which can be directly transferred into the environment, either into existing streams, naturally occurring underground water, or into an existing sewer system.

The concentrated stream of the membrane system can be recycled into the feed inlet of the first step or it can be added to the thickened sludges if the solid content is sufficiently high. For agricultural waste, the concentrate is rich in nitrogen components. Many of the nitrogen components are soluble and usually pass through the liquid separation phase.

In a final step, calcium carbonate may be added to help neutralize the pH of the resultant sludge and prevent the formation of malodorous compounds, reducing bad odors.

The process described herein for treating pig and swine waste has many advantages. First, it greatly reduces the large volume of sludge and results in a sludge product that can be transferred into the environment without malodorous odors typically emanated by sludges, especially agricultural waste such as liquid manure from pig houses. Typically, malodorous odors are generated by storage of wet sludge in huge volume tanks.

The method and system also provide for the environmental improvement of the liquid waste or water that can now be safely returned to the environment, both for agricultural purposes or returned naturally to streams or into sewer systems.

In an alternative embodiment of the invention a method and system are employed where the solid/liquid separation is a partial dehydration system that uses flocculation and decantation. In this embodiment the sludges in step one, which are swine waste and pig waste, are fed through a conical tank. A polymer must be added to the sludges to permit coagulation and flocculation to occur. The polymer reacts with solids to form a cake-like material and the water is evacuated by gravity at the base of the inverted cone. This process may be operated in a batch mode during a 12-hour cycle approximately. The free water is continuously evacuated from the conical tank and can be stored in a separate tank before it achieves the second treatment step. The system does not need very much volume and can also be delivered in a fixed or mobile unit, depending on the particular needs. This technology is commercially available in Canada by Valoration, Holbrothe, Quebec.

When the sludge has thickened, it is removed from the conical tank. The concentration of sludges is usually higher than 20 percent solids. The removed sludges can then be stored for agricultural spreading or used for composting. During storage, it is recommended to add calcium carbonate ($C_aCO_3$) to the sludges for stabilization, pH reduction, and retention of nitrogen components. Calcium carbonate reacts with malodorous volatile components, such as hydrogen sulfur, to form salts. This chemical prevents undesirable odors from emanating from the sludges.

Other technologies may be used for solid/liquid separation for step one which may include screening microfiltration, ultrafiltration, and decantation. Microfiltration or ultrafiltration can be used in complement with another liquid/solid separation technology like the rotary press, to improve the quality of the liquid that goes to the second phase.

With respect to treatment of the liquid or water stream that results from the sludge separation, the water may be treated with other technologies such as ion exchange or chemical precipitation. The advantage of the membranes is that it can be continuous and other chemical are not involved for enhancing the quality of the water for return to the environment safely.

Another advantage is that the process, which is very economical and mobile, can be automated.

It is an object of this invention to provide an improved method and system for treating pig and swine waste products, such as manure and liquid manure, economically to provide an environmentally safe residue that can be returned to the environment.

It is another object of this invention to provide an improved process for economically treating food, agricultural, and municipal treatment sludges, including animal waste such as pig and swine manure, solid and liquid, in order to economically remove odors, to reduce the volume of the sludge, and to provide both a treated sludge and water that can be safely returned to the environment in an economical manner.

But yet still another object of this invention is to provide an economical process and system for managing agricultural sludges such as liquid manure, to reduce air contamination, especially odors, water contamination such as streams and water tables and municipal water supplies, and agricultural soil contamination economically and safely, without the use of harsh chemicals.

In accordance with these and other objects which will become apparent hereinafter, the instant invention will now be described with particular reference to the accompanying drawings.

BRIEF DESCRIPTION OF THE DRAWINGS

FIG. 4 shows a conventional rotary press schematically that can be used with the present invention.

DESCRIPTION OF THE PREFERRED EMBODIMENTS

Figure 1:
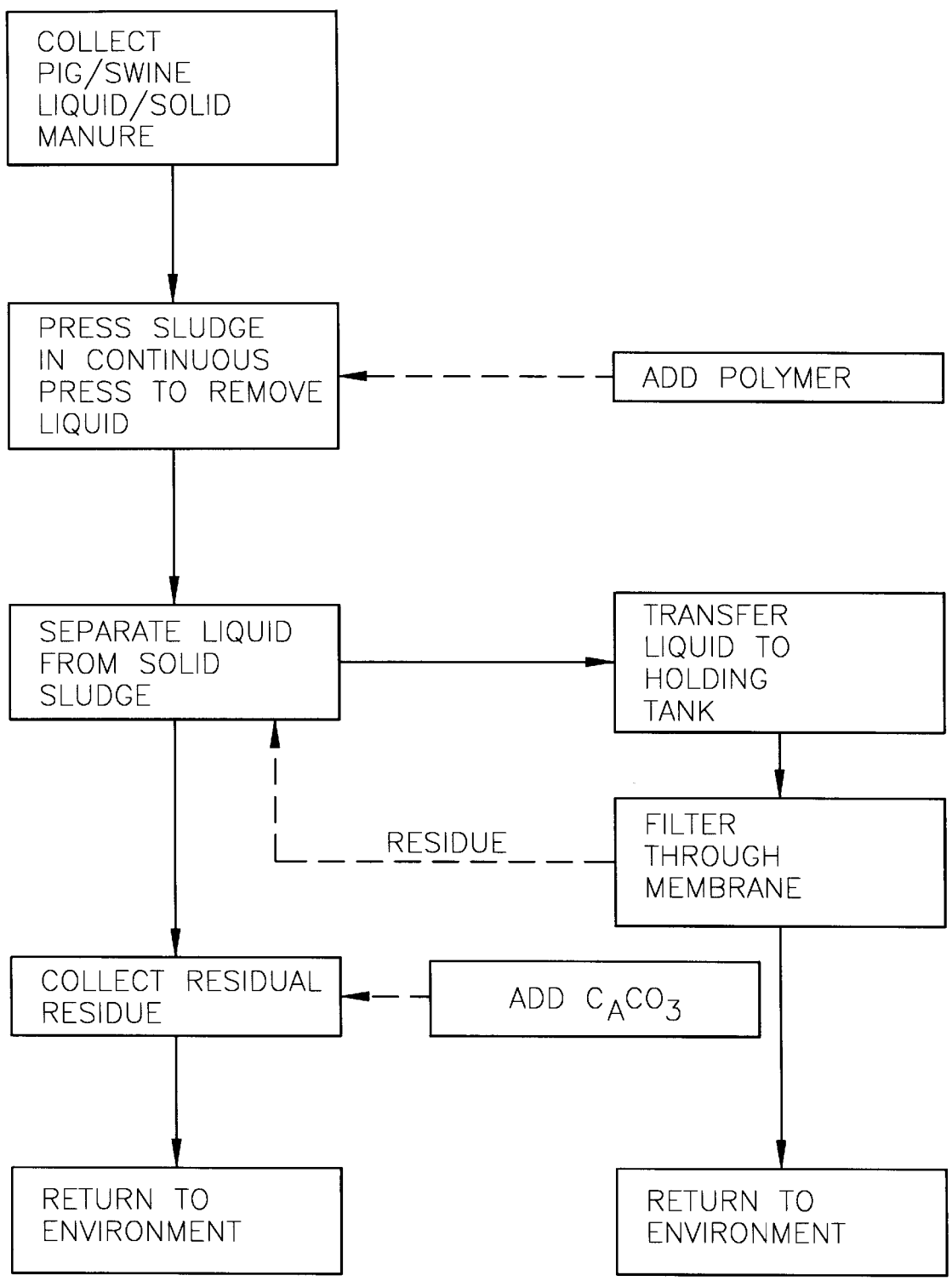
FIG. 1 shows a flow chart or flow diagram showing the preferred embodiment of the present invention.

Referring now to the drawings and in particular FIG. 1, the method of the invention is shown in a flow chart. The first step of the invention (which can be automated as a function of volume to treat) is to collect the pig and swine liquid and solid manure into some type of holding container or holding pond, shown in step 10. The next step 12 is to transfer liquid and solid manure to a sludge mechanical press, preferably one with a continuous process, where the liquid is removed from the sludge. The pressing step 12 is done and may include adding a polymer 14 as a step to enhance the drying process. After the sludge is pressed, separation between the liquid and sludge takes place from the press and the liquid is transferred to a holding tank 18. The remaining sludge is then collected as residual sludge 20. This step calcium carbonate ($C_aCO_3$) may be added to raise the pH to eliminate odors. After that is done (which is optional), the sludge is then returned to the environment safely 28.

The liquid that was transferred in step 18 to the holding tank then is filtered through a membrane 22 to remove undesirable pollutants in the water. Any residue that does not pass through the membrane may be returned to the separation of the liquid and sludge in the press. Once the filtered water is passed through the membrane in step 22, the water may be safely returned to the environment 24 as the final step in the process.

Figure 2:
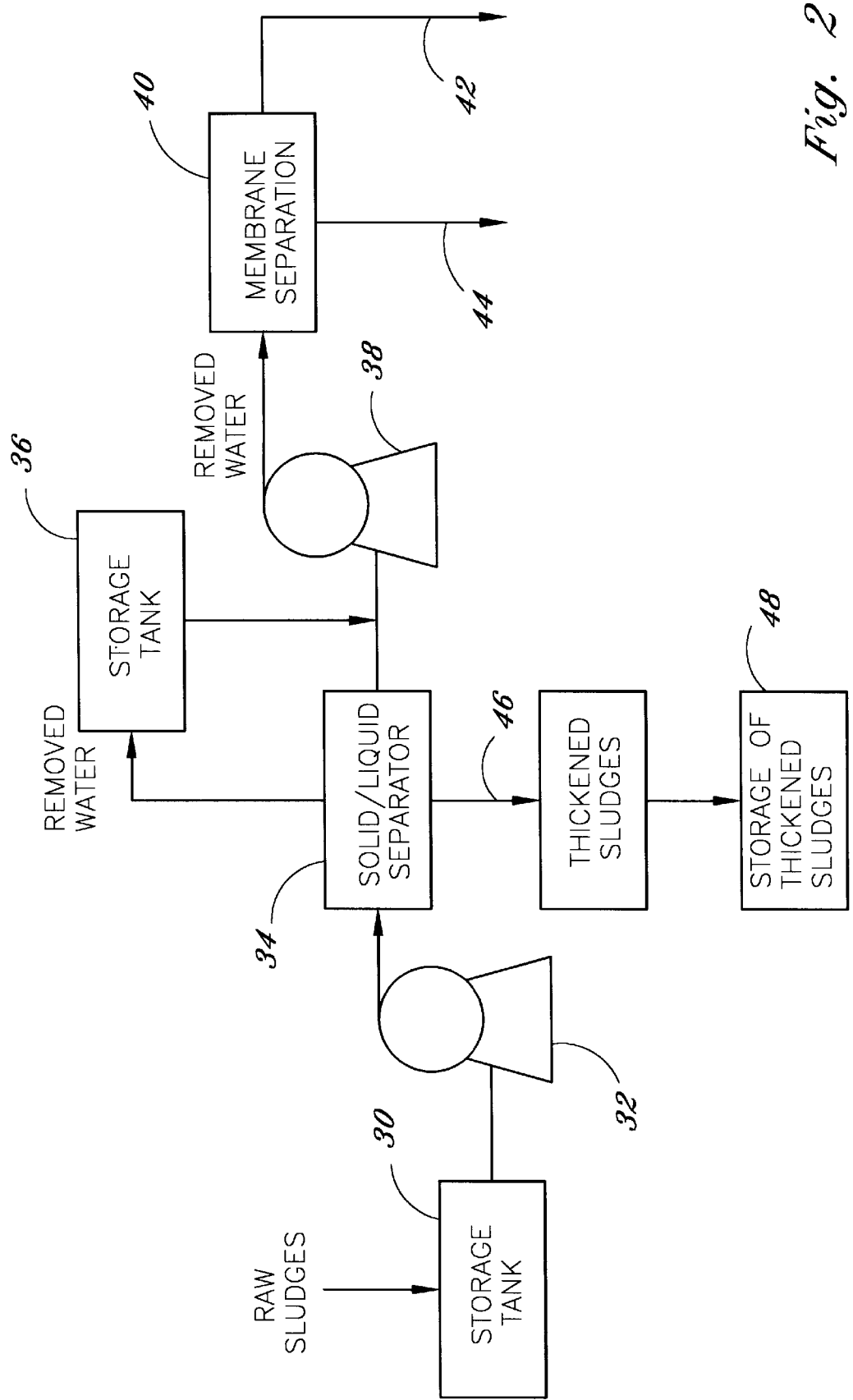
FIG. 2 shows a schematic diagram of a continuous process used for the present invention.

As can be understood from the process, it is economical, efficient because it is continuous and allows for treating large amounts of sludge quickly and efficiently. FIG. 2 shows a schematic diagram of the method shown in FIG. 1. Specifically, the raw pig or swine sludge is deposited in a storage tank. From the storage tank a pump 32 pumps the sludge into a press 34 called a solid liquid separator. The continuous press 34 thus acts to squeeze out in a continuous process excess water that is retained in the sludge such that the water is pumped from one area of the press to a separate water storage tank 34. Simultaneously, the thickened sludge that has water removed itself is a continuous process that can be transferred to a conduit 46 into a separate storage tank 48 that contains the thickened sludge. This sludge is ready to be placed into the environment.

The storage tank containing the water 34 then allows the water to be pumped by pump 38 to the membrane separation 40 which is a tank with a membrane of water coming in one side that allows the filtered water to pass through the membrane and out through conduit 42 where it can be returned to the environment to sewer or to streams or for agricultural use for watering. Any of the materials that were not passed through the membrane can be returned through conduit 44 through the first storage tank to be treated over or to the storage of the thick and sludge.

Thus, the sludge that has been dried out in which odors have been removed is thus suitable for return to the natural environment safely and efficiently. Likewise, the water that has been passed through the membrane is itself safe enough to be returned to a natural environment or to a sewage system.

In an alternate embodiment, the solid/liquid separation could be accomplished using partial dehydration, flocculation and decantination wherein the sludges are fed to a conical tank that is inverted. A polymer must be added to the sludge to permit coagulation and flocculation to occur. The polymer reacts with solids to form a cake like material wherein the water would be evacuated by gravity. This process is operated in a batch mode during 12 hour cycles approximately. The free water would be continuously evacuated from the conical tank during the process and can be stored in a tank before the second treatment step.

When the thickening of the sludge is complete, the sludge is removed from the conical tank and can be stored for agricultural spreading or composting. Calcium carbonate ($C_aCO_3$) should be added to the sludge to stabilize and to and to retain nitrogen components. The calcium carbonate also reacts with malodorous volatile components like hydrogen sulfur to form salt. This chemical prevents the malodorous odors. Solid liquids separation could also be accomplished from screening and microfiltration, ultrafiltration, or decantination. Microfiltration or ultrafiltration can be used in combination with screening or rotary pressing. However, the rotary continuous press described in here is the preferred embodiment.

As described as to the liquid treatment by pressure driven membranes separation technology. Nanofiltration and or reverse osmosis used to separate residual contaminants in the water as described in FIG. 1 method and FIG. 2 which produces two different streams. They are fed using a tangible flow direction to the membrane. The separation occurs using pressure force to the feed. The first stream is called concentrate because it contains the contaminants rejected by the membrane. A second stream is called the permeate and it contains water and salt that pass through the membrane. The permeate is the final product of the process that can be directly rejected to the environment. In alternative embodiment, the water could be treated with an iron exchange or chemical precipitation to prepare it for return to the environment. The concentrate stream if necessary can be returned to the first step feed or added to the thick and sludge if the content is sufficiently high. The separated liquid (water) could additionally be subjected to electropotentials (anode and cathode) to remove metallic ions such as $Z_n^{2+}$ ions and chromium ions.

Figure 3:
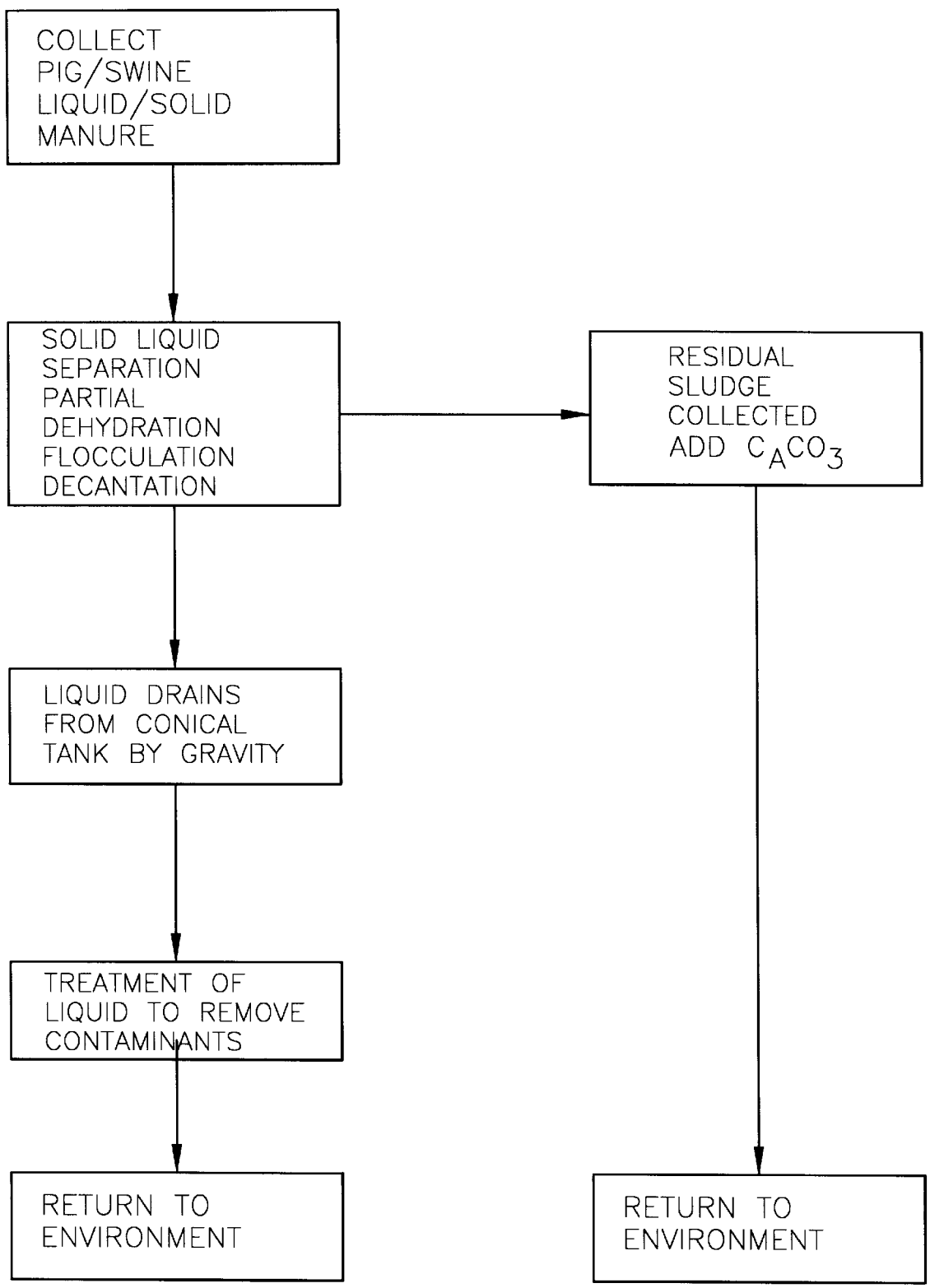
FIG. 3 shows a flow chart of an alternate embodiment which includes the present invention.

FIG. 3 shows the method and flow chart of the alternative embodiment of the invention.

FIG. 4 shows a rotary press that can be used on a continuous basis to separate liquid and water from the sludge leaving a dry cake sludge. The sludge is fed into a peripheral channel and has walls made up of filter elements which allow the liquid to pass through while retaining the solid. The wheel as it moves generates a compressive and driving force on the sludge cake which is formed. The compressive force coupled with a minimum inlet pressure and outlet restrictive action results in a cake whose level of dryness is high. As the sludge is continuously fed into the device, the cake extrusion is continuously fed out of the device while at the same time the water is continuously being removed by the compressive forces. As an example, a Fournier rotary press for dewatering located in Blacklake Quebec, Canada could be utilized.

The use of the above described invention has many advantages. First of all, it permits reduction of pig and swine waste sludge volume to give a final product that can be disposed safely into the environment at low cost. The process also minimizes undesirable odors that eminent from the sludge particularly with a pig manure generated by the large pig farms currently found throughout the United States. Also large amounts of water removed from the sludge can be safely returned directly into a stream and existing sewage system or can be agriculturally for water.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. The method for treating pig and swine liquid and solid manure to provide a residual dewatered sludge that can be safely returned to the environment for agriculture use and water that can be safely returned to the environment consisting of the steps of:

(a) collecting pig and swine combined liquid and solid manure to a single holding area;

(b) compressing the collect pig and swine liquid and solid manure to remove water from the manure;

(c) separating the water resulting from compressing the manure from the dewatered sludge;

(d) transferring the separated water from the dewatered sludge into a holding device;

(e) collecting the residual dewatered sludge in a predetermined area;

(f) returning the residual dewatered sludge to the environment;

(g) filtering the water removed and separated from the dewatered sludge through a nano filtration device and reverse osmosis device under high pressure creating a filtered stream of water and an unfiltered residual stream of water;

(h) collecting said filtered stream of water in a holding area;

(i) returning said filtered water to the environment where it is safe for agricultural purposes and disposal in a sewage system; and (j) returning said unfiltered residual stream of water back to said single holding area containing the collected pig and swine combined liquid and solid manure.

2. A method as in claim 1 including the step of:

(a) adding polymer to the sludge as it is being compressed for removing water to enhance the water separation.

3. The method for treating pig and swine manure as in claim 2, including the step of:

(a) adding calcium carbonate to the residual sludge dried residue after it has been dewatered to reduce odor.

* * * * *